United States Patent [19]

Kolb et al.

[11] 4,271,950
[45] Jun. 9, 1981

[54] CLUTCH MOUNTING AND ACTUATING DEVICE

[75] Inventors: Dieter Kolb, Kissingen; Karl Müller, Poppenhausen, both of Fed. Rep. of Germany

[73] Assignee: Fichtel & Sachs AG, Schweinfurt, Fed. Rep. of Germany

[21] Appl. No.: 6,496

[22] Filed: Jan. 25, 1979

[30] Foreign Application Priority Data

Feb. 7, 1978 [DE] Fed. Rep. of Germany ....... 2805045

[51] Int. Cl.$^3$ ............................................ F16D 23/14
[52] U.S. Cl. ................................. 192/98; 192/110 B
[58] Field of Search ....................... 192/45, 98, 110 B; 308/233, 234, 236, 184, 189 R

[56] References Cited

U.S. PATENT DOCUMENTS

| | | | |
|---|---|---|---|
| 3,788,437 | 1/1974 | Camp | 192/98 |
| 3,877,557 | 4/1975 | Maucher | 192/98 |
| 4,093,053 | 5/1978 | Ernst et al. | 192/98 |
| 4,159,052 | 6/1979 | Ernst et al. | 192/98 |

FOREIGN PATENT DOCUMENTS

| | | |
|---|---|---|
| 339455 | 12/1930 | United Kingdom . |
| 851128 | 10/1960 | United Kingdom . |
| 1121841 | 7/1968 | United Kingdom . |
| 1310331 | 3/1973 | United Kingdom . |
| 1410626 | 10/1975 | United Kingdom . |
| 1434493 | 5/1976 | United Kingdom . |
| 1441804 | 7/1976 | United Kingdom . |
| 1473139 | 5/1977 | United Kingdom . |
| 1477469 | 6/1977 | United Kingdom . |
| 1515756 | 6/1978 | United Kingdom . |

Primary Examiner—Henry Jaudon
Attorney, Agent, or Firm—Toren, McGeady and Stanger

[57] ABSTRACT

A clutch mechanism particularly suited for motor vehicles is structured to include a roller bearing assembly which is composed of a rotary member, a stationary or nonrotative member and roller bodies operatively interposed therebetween. Clutch actuation is effected by axial movement of the roller bearing assembly in order to bring the rotating member into position relative to the clutch releasing mechanism. The roller bearing assembly is mounted on a guide element which includes a clutch control device and an annular connecting member is interposed between the guide element and the stationary member of the roller bearing assembly in order to transmit clutch actuating forces therebetween. The connecting member is configured to maintain the guide element and the stationary member rotatively fixed relative to each other while allowing free radial movement therebetween. The connecting member is particularly formed to include first and second portions which are radially and circumferentially displaced relative to each other about the annular connecting member, with the first portions being in fixed rotative engagement with the guide element and with the second portions being in fixed rotative engagement with the stationary member of the roller bearing assembly.

21 Claims, 12 Drawing Figures

CLUTCH MOUNTING AND ACTUATING DEVICE

BACKGROUND OF THE INVENTION

The present invention relates generally to clutch mechanisms and more particularly to a clutch release device especially suitable for use in motor vehicles which comprises a roller bearing assembly arranged between release members of the clutch and the clutch control members, the roller bearing assembly being composed of a rotating bearing ring, a stationary bearing ring and roller bodies operatively interposed therebetween. The roller bearing assembly is mounted for clutch actuation upon a guide element which is adapted to be axially moved by the control members to effect clutch operation, with the roller bearing assembly being mounted relative to the guide element to be freely radially movable to a predetermined extent relative thereto.

Clutch release devices of the type mentioned above are known, for example, from French Pat. No. 1,600,080. The device of this patent involves a release mechanism wherein the roller bearing assembly is arranged within a housing to be radially movable but not freely movable. Accordingly, this clutch mechanism can operate to center itself when it is actuated. The stationary bearing ring of the roller bearing assembly of this clutch mechanism is pressed by means of a cup spring against an axial shoulder of a slide sleeve which forms the guide element, the shoulder being covered with a frictional coating. The frictional coating insures that centering is maintained when the clutch is not actuated and it may therefore be expected that the individual parts will be subject to little wear. On the other hand, however, the construction of this clutch release device is relatively cumbersome and the assembly is deemed relatively complicated since, in such a configuration, the cup spring must be pretensioned.

A similar clutch release device is known from French Pat. No. 1,387,978 wherein the roller bearing is arranged within the housing so as to be radially and axially movable, thereby exhibiting characteristics which enable the clutch to reinstitute a centering movement during each coupling procedure. In this clutch release device, the assembly is simpler but, nevertheless, increased wear occurs during operation.

The present invention is directed to the task of providing a clutch release device which facilitates self-centering of the clutch in a less troublesome manner while also providing a configuration which may be produced and assembled with greater facility and which operates so that its individual parts will be subjected to as little wear as possible.

SUMMARY OF THE INVENTION

In accordance with the invention, a clutch mechanism particularly suitable for use in motor vehicles is constructed to include a roller bearing assembly which is composed of a rotating member and a stationary or nonrotating member with roller bodies operatively interposed therebetween. Clutch releasing means are arranged in operative association with the rotating member and a guide element having the roller bearing assembly mounted thereon includes clutch control means for effecting actuating movement of the clutch by movement of the guide element with the roller bearing assembly mounted thereon. The invention is particularly directed to connecting means interposed between the guide element and the stationary member for transmitting the clutch actuating forces therebetween. The connecting means are configured to maintain the guide element and the stationary member rotatively fixed relative to each other while at the same time allowing a predetermined degree of free radial relative movement therebetween.

In a particular embodiment of the invention, the connecting means are formed to comprise a resilient ring having first and second portions which are radially and circumferentially displaced relative to each other, with the first portions being in fixed rotative engagement with the guide element while the second portions are in fixed rotative engagement with the stationary member.

Thus, in accordance with the present invention, many of the disadvantages of the prior art are overcome in that the connecting element transmitting the releasing force from the guide element to the stationary bearing ring of the bearing assembly is rigidly connected to the guide element and to the stationary bearing ring. By establishing between the roller bearing assembly and the guide element a connection which is rotatively rigid while allowing for free radial self-centering movement between the parts, there occurs an operating mode whereby wear between the roller bearing and the guide element is eliminated. The self-centering function of the clutch is fully maintained and the overall assembly is relatively simple and uncomplicated from a structural and manufacturing viewpoint.

The wear which may result is reduced to an especially significant degree when the connecting element is connected to the stationary bearing ring and/or to the guide element or a part rigidly connected to the bearing ring or the guide element in a positive locking manner in the circumferential direction while being freely movable in the radial direction.

In a preferred embodiment of the invention one of the rigid connections of the connecting element to the stationary bearing ring or to the guide element is a frictional clamping connection acting in the circumferential direction. In this case, the clamping connection provides a favorable condition from the point of view of the assembly of parts.

In a further development of this embodiment of the invention the connecting element is formed as an axially arranged annular disk which has radially projecting lips at one of its radial edges in order to produce the positive locking connection with radially open recesses of the stationary bearing ring or of the guide element, or of a part connected to the bearing ring or the guide element, with a ring being axially clamped between oppositely located grooves in the annular disk and an axial end face of the other component for the clamping connection to the other component. Such an embodiment is distinguished particularly by the fact that the individual parts are easy to produce and simple to assemble.

In accordance with a further development of the invention it is also possible to form the connecting element as a ring which is resilient in the radial direction and which is seated in a circumferential groove of the stationary bearing ring or the guide element, or a part rigidly connected to the stationary bearing ring or the guide element, with the ring having radial lips or recesses which interact with the radial recesses or lips of the other interengaging component. Due to the clamping action of the internal stresses developed, the design of a connecting element with these properties facilitates simple assembly in the circumferential direction despite the development of sufficient transmission forces.

In such a case, this connecting element is preferably constructed as an open wire ring of round steel having a mean diameter selected such that the ring can be placed in a seating groove with internal stress, with the lips being bent away from the mean diameter either inwardly or outwardly. Such a wire ring of round steel can be inexpensively produced from material which is readily available and, due to its significant inherent elasticity, it can be easily manipulated in the radial direction.

In order to simplify the assembly procedures involved with the roller bearing assembly, the guide element and the connecting element, it is preferably provided that the guide element be constructed in two parts. The guide element may, for example, be constructed as a sleeve and a ring may be slidingly mounted thereon, with the ring, in the direction of its sliding engagement, having open recesses for the lips of the connecting element and engaging a reduced portion of the guide element. Such an assembly is made possible even when the connecting element does not have inherent elasticity in the radial direction, and the rotatively rigid connection with the stationary bearing ring is insured in another manner.

In a clutch release device wherein the portion of the stationary bearing ring or of the guide element which contains the recesses consists of a deformable material, for example sheet metal, between the recesses and the axial edge of this material portion there may be provided a tongue or web which can be bent up and which borders the recesses towards the edge. The assembly of such a clutch release device is relatively simple since the individual parts may be assembled when the tongue or web is in the upwardly bent position and, subsequently, they can be secured by bending the tongue or by deforming the webs.

In a clutch release device in which the guide element is constructed as a slide sleeve, the groove is preferably provided at the inner periphery of the slide sleeve and it has at its bottom openings which extend radially through the sleeve and allow the passage of the radially outwardly projecting lips which engage the recesses of the stationary bearing ring. In this case, as in the other embodiments, the groove is preferably formed with a trapezoidal cross section which guarantees an especially tight clamping seat of the spring ring. In the aforementioned embodiment, the inwardly widening groove forms a space for a supply of grease for lubricating the slide sleeve. Finally, the lips extending radially outwardly through the slide sleeve facilitate simple assembly of the roller bearing device from the inside.

In order to further simplify the assembly procedures involved with the roller bearing assembly, the guide element and the connecting element, the component containing the groove may have an entry guide bevel. Because of this bevel it becomes possible to mount the three parts by simply sliding them together in the axial direction, the connecting element expanding at the bevel and, in the region of its final seat, being either fixed by a stop or being snapped into a corresponding groove, possibly having conical side surfaces.

Within the context in which the aforementioned connecting elements have been described, they may also be components which receive a circular contour only in the assembled state. The lips may be formed on these components in a unitary manner or in a different manner, for example, by lateral caulking of the material, so that the surface can be locally increased for reducing surface load.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
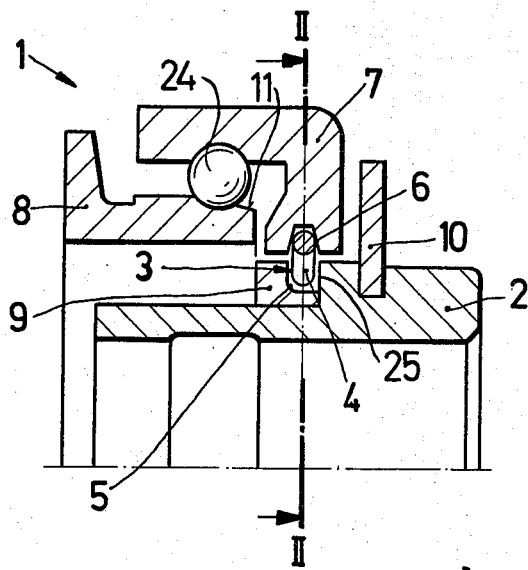
FIG. 1 is a sectional view of a clutch release device in accordance with the present invention having a wire ring of round steel mounted in a conical groove of a stationary bearing ring of a roller bearing assembly, the view being taken along the line of I—I of FIG. 2.
Figure 2:
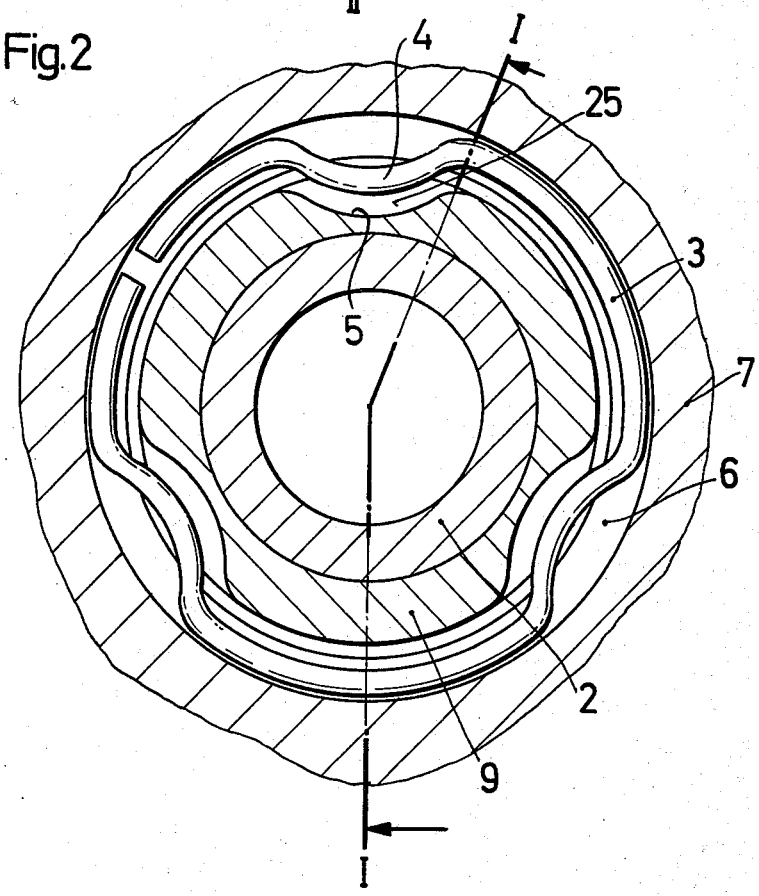
FIG. 2 is a sectional view of the embodiment of FIG. 1 taken along the line II—II.

Referring now to the drawings, wherein similar parts are identified by like reference numerals throughout the various figures thereof, there is shown in FIGS. 1 and 2 a first embodiment of a clutch release device in accordance with the present invention including a roller bearing assembly 1 which consists of a stationary or nonrotative bearing ring 7, a rotating bearing ring 8 and roller bodies 24 interposed therebetween. The rotating bearing ring 8 is operatively arranged to interact with release members (not shown) of the overall clutch device whereby clutch actuation may be performed. The roller bearing assembly is generally constructed in a unitary arrangement which is operatively mounted together with a guide element 2 formed as a slide sleeve. The mounting of the roller bearing assembly 1 on the guide element 2 is effected by connecting means which comprise a connecting element 3 constructed in the form of an open, resilient wire ring of round steel interposed between the stationary bearing ring 7 and the guide element 2.

The connecting element 3 is held in place under internal radial stress within a conical groove 6 of the stationary bearing rings 7. The element 3 is formed with three lips 4 which are radially inwardly bent and which are distributed over the circumference of the element 3. Thus, it will be seen that the connecting element 3 is formed with first and second portions which are radially displaced and circumferentially displaced from each other. The lips 4, which may be considered the first radially inwardly displaced portions, are engaged within openings 5 formed in a ring 9 which, during the assembly of the release device, is slideably moved onto the guide element 2 up to a reduced portion 25. Between each of the lips 4 and the bottoms of the openings 5, there are provided spaces to facilitate a desired maximum play or displacement of the roller bearing 1 in a radial direction relative to the guide element 2. On the other hand, taken in the circumferential direction, the lips 4 of the connecting element 3 are configured to provide a positive locking engagement which is rigid against rotation within the openings 5 of the ring 9 of the guide element 2. Since the connecting element 3 is also tightly clamped into the conical groove 6 of the stationary bearing 7 due to its internal stress, relative rotation between the guide element 2 and the ring 7 is prevented.

The clutch pedal (not shown) acts on a ring 10 which is rigidly connected to the guide element 2 in order to effect actuation of the clutch mechanism.

In the case where misalignment occurs between the axis of rotation of the clutch and the axis of gearing attachments (not shown) which guide the guide element 2, the illustrated clutch release device will facilitate radial displacement of the bearing assembly 1 while simultaneously providing locking engagement in the circumferential direction acting against relative rotation of the parts.

Figure 3:
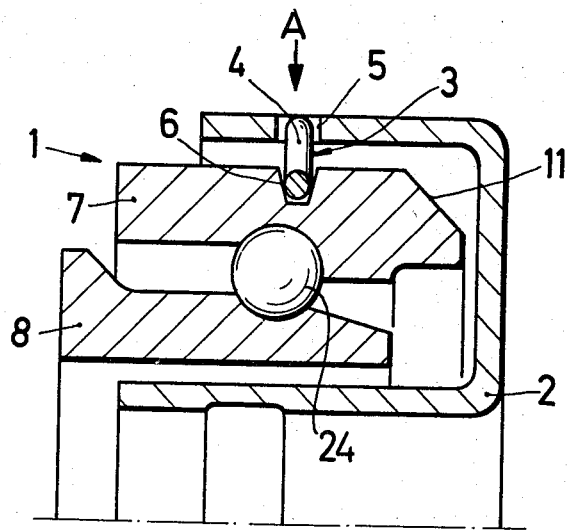
FIG. 3 is a longitudinal sectional view of a clutch release device utilizing a wire ring of round steel as the connecting element of its roller bearing assembly to a slide sleeve of sheet metal.

In FIG. 3 there is depicted a clutch release device in accordance with the present invention wherein the guide element 2 is constructed in the form of a sheet metal part. This sheet metal part is configured with a generally U-shaped cross section and it is arranged to extend about the roller bearing assembly 1 on three sides thereof, the bearing assembly 1 again consisting of the rotating bearing ring 3, the stationary bearing ring 7 and the roller bodies 24.

In the arrangement depicted in FIG. 3, the stationary bearing ring 7 is formed as the outer member or ring of the roller bearing assembly 1. The conical groove 6 for receiving the connecting element 3 which is shaped in the form of a wire ring of round steel is provided at the outer periphery of the bearing ring 7. The connecting element 3 is formed with radially outwardly projecting lips 4 which are arranged in corresponding openings 5 of the guide element 2 in order to be radially movable relative thereto but in order to be fixed rigidly against relative rotation therebetween. Accordingly, the connecting element 3 is frictionally held on the stationary bearing ring 7 thereby enabling the roller bearing assembly 1 to align itself in the radial direction of the device. Simultaneously, the bearing ring 7 is prevented from rotating relative to the guide element 2 by a positive locking engagement which is provided by the device of the invention. In this case, as in the case of the embodiment depicted in FIGS. 1 and 2, the entire release force is transmitted from the connecting element 3 in the axial direction. In order to simplify the assembly, the bearing ring 7 is formed with an entry guide bevel 11. The connecting element 3 may be placed over the guide element 2 and due to its resilient characteristics it will be radially outwardly expanded by the configuration of the bevel 11 when the roller bearing assembly 1 is moved in the axial direction. Subsequently, the connecting element 3 will eventually snap into engagement into the conical groove 6.

Figure 4:
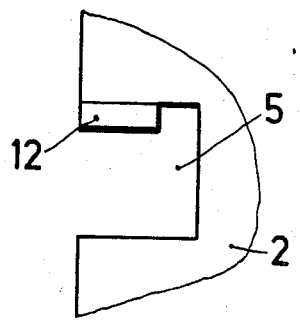
FIGS. 4 and 5 are partial views taken in the direction of the arrow A of FIG. 3 showing a construction wherein sheet metal tongues which may be bent between two positions are provided.
Figure 5:
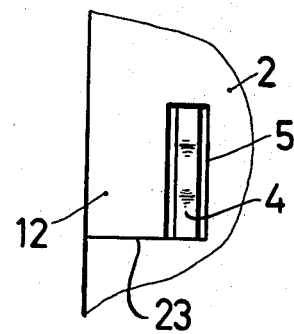

In view of the fact that the guide element 2 of the embodiment according to FIG. 3 is constructed of a thin-walled material there arises a further possibility for facilitating fastening of the roller bearing assembly 1. FIGS. 4 and 5 show a detail of the guide element 2 as seen from the exterior thereof in views taken in the direction of the arrow A of FIG. 3. As shown in FIGS. 4 and 5, the guide element 2 is formed with openings 5 in which there are engaged the lips 4 of the connecting element 3 in order to provide a connection which is rotatively rigid but which is not rigid in the radial direction. As seen in FIG. 5, the openings 5 are provided with a free punch or slit 23 which extends toward the axial edge of the outer leg of the sheet metal part in an axial direction thereby forming tongues 12. As indicated in FIG. 4, the tongues 12 may be bent outwardly in order to allow insertion of the roller bearing assembly 1 with the connecting element 3 already mounted thereon. With the tongues 12 bent upwardly as shown in FIG. 4, an opening is provided which permits the connecting element 3 to be moved without obstacle into the openings 5. Subsequently, the tongues 12 may be again bent downwardly into the position according to FIG. 5 whereby the edge of the openings is once again closed.

As a result of this configuration, a simple assembly procedure is possible particularly in those cases in which radial expansion by means of a bevel according to FIG. 3 cannot be provided.

Figure 6:
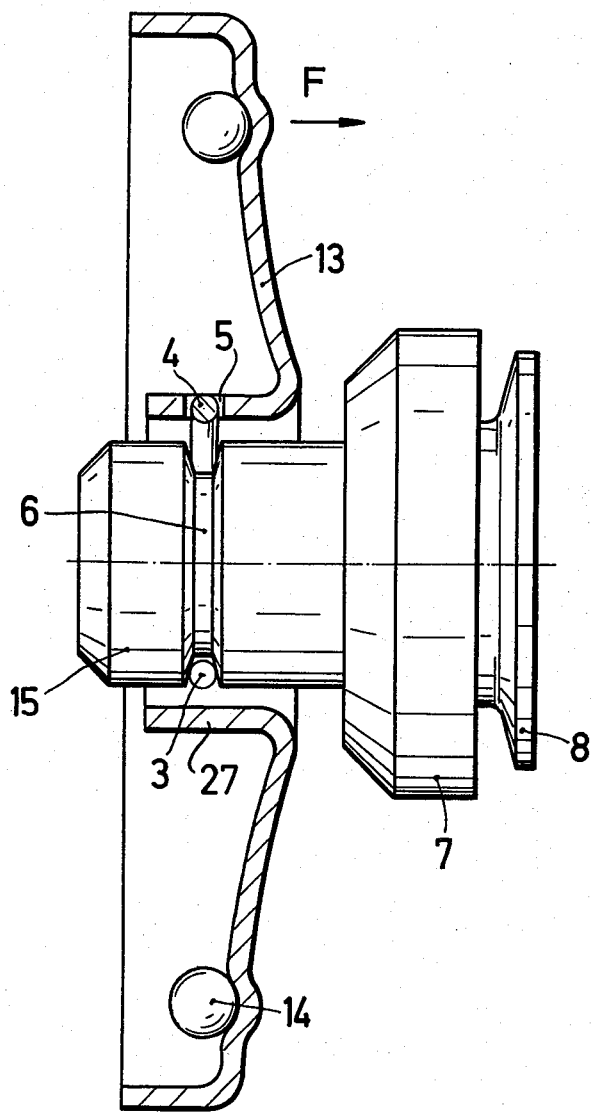
FIG. 6 is a partial sectional view of a clutch release device and a release lever.

In FIG. 6 there is depicted another embodiment of a release device in accordance with the present invention which provides relative movement of the parts radially but which is rigidly connected against rotation through a connecting element 3 constructed in the form of an open, resilient wire ring of round steel. The roller bearing assembly 1 consists, in the conventional manner, of the stationary bearing ring 7 and the rotating bearing ring 8 which acts upon the release members of the clutch (not shown). A tubular piece 15 is directly connected to the stationary bearing ring 7 or it may be formed integrally therewith. On the tubular piece 15 there is arranged a conical groove 6 into which the connecting element 3 is fitted so as to be rigidly engaged against rotation by its internal stress. A release lever 13 with a fulcrum 14 has a cylindrical portion 27 in the region of the tubular piece 15 and surrounds the tubular piece 15 at an appropriate distance. In this cylindrical portion of the release lever 13 there are arranged at least two openings 5 which are provided at the circumference thereof and into which the lips 4 of the connecting element 3 project in a manner enabling radial play.

The release procedure of the clutch release device depicted in FIG. 6 is effected by applying a force in the direction of the arrow F on the release lever 13. Due to the fact that the roller bearing assembly 1 can move radially relative to the release lever 13, radial movements about the fulcrum 14 will have no effect.

Figure 7:
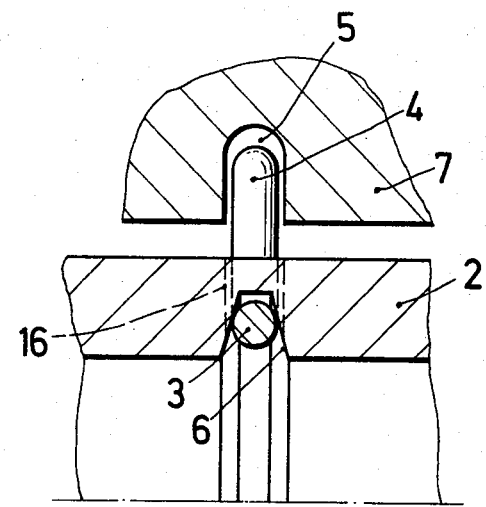
FIG. 7 is a longitudinal sectional view showing a detail of a clutch release device having a wire ring of round steel which may be mounted through a slide sleeve from the inside.

In FIG. 7 there is depicted in longitudinal section a clutch release device which is formed with a design similar to that of the device depicted in FIG. 1. However, in the arrangement of FIG. 7, the connecting element 3 has been changed and the assembly is affected in a different manner. Once again, the roller bearing assembly 1 is shown to consist of the stationary bearing ring 7, with the rotating bearing ring 8 and the roller bodies 24, which also form parts of the bearing assembly 1, not being shown in FIG. 7. The roller bearing assembly 1 is arranged so as to be radially moveable but to be rigidly fixed against rotation relative to the guide element 2, which is constructed as a sleeve. For rigidly receiving the connecting element 3 which is shaped as a wire ring of round steel, the guide element 2 is provided with a conical groove 6 which is arranged at its inner periphery and which widens radially inwardly. In those regions in which the radially outwardly arched lips 4 of the connecting element 3 are provided, the guide element 2, starting from the conical groove 6, is provided with corresponding cutouts 16. The lips 4 extending through the cutouts 16 reach into corresponding openings 5 of the stationary bearing ring 7. Between the lips 4 of the connecting element 3 and the openings 5, and also between the inner jacket of the stationary bearing ring 7 and the outer jacket of the guide element 2, there is provided an appropriate distance to permit self-centering of the roller bearing assembly 1. On the guide element 2, with axial distance to the roller bearing assembly 1, there is arranged a ring (not shown) for applying the release force on the clutch release device.

The assembly of the individual parts of the clutch release device is effected by inserting the connecting element 3, which is elastically pretensioned to a smaller diameter, into the inner diameter of the guide element 2. In the region of the conical groove 6, the connecting element 3 is allowed to widen in diameter as the result of its radial pretensioning force, the lips 5 thereby moving outwardly through the cutouts 16 until the circular portion of the connecting element 3 rests against both sides of the conical groove 6. During this assembly procedure, the roller bearing assembly 1, with the openings 5 in the stationary roller bearing ring 7, must have already been placed onto the guide element 2 before the connecting element 3 is inserted. By extending the oblique surfaces of the conical groove 6 radially inwardly, there results a space which may receive a supply of lubricant for the guide element 2 in order to lubricate the guide tube (not shown) of the gear assembly.

Figure 8:
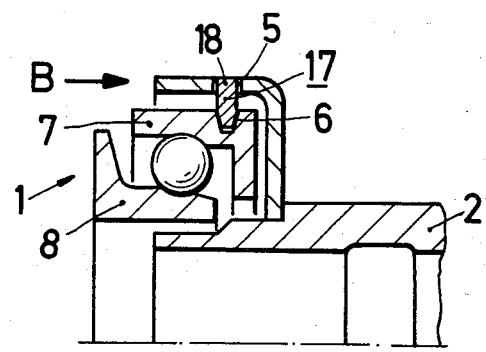
FIG. 8 is a longitudinal sectional view taken through a further modification of the clutch release device.
Figure 9:
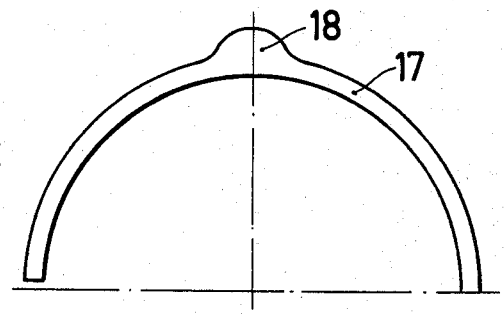
FIG. 9 is a partial plan view of a connecting element formed as a flat wire ring with calked lips for the clutch release device according to FIG. 8.

FIG. 8 shows a further embodiment of a clutch release device in accordance with the present invention having a modified connecting element 17. The connecting element 17 of FIG. 8 is shown in greater detail in FIG. 9 as comprising the shape of an open spring ring, particularly formed of flat wire steel. It has a constant inner diameter and lips 18 are formed to extend radially outwardly therefrom. In this case, the lips 18 may be formed integrally with the material of the connecting element 17. As a result of its internal stress, the connecting element 17 rests with its inner diameter in a groove 6 of the stationary roller bearing 7 of the roller bearing assembly 1. In this region, the cross section of the connecting element 17 may be rectangular or conical. The lips 18 reach through corresponding openings 5 of a housing component which is rigidly connected to the guide element 2 and which thus forms the rotatively rigid connection. The rotating bearing ring is once again denoted by the reference numeral 8 and the assembly of this clutch release device may, for example, be effected in a manner whereby the connecting element 17 with its lips 18 engaging the openings 5 of the housing being expanded by engagement with a corresponding oblique surface (not shown) of the stationary bearing ring 7 during insertion of the roller bearing assembly 1, with the element 17 subsequently snapping into the groove 6. The ring 17 may be die-punched.

Figure 10:
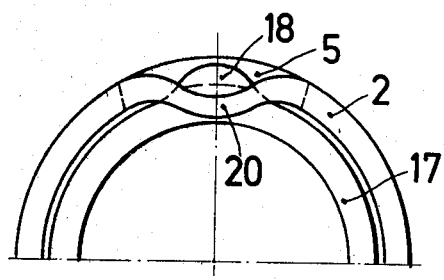
FIGS. 10 and 11 are partial plan views of modified clutch release devices of the type depicted in FIG. 8, seen in the direction of the arrow B of FIG. 8, having enlarged bearing surfaces on the wire ring.
Figure 11:
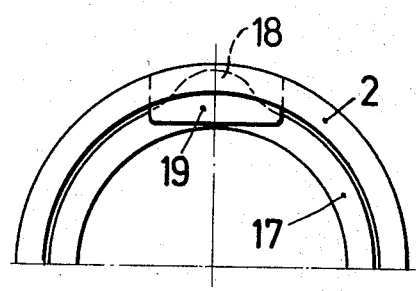

FIGS. 10 and 11 show two views, taken in the direction of the arrow B of FIG. 8, with each of the FIGS. 10 and 11 depicting alternative embodiments of the device of FIG. 8. In each case, only a detail of the guide element 2 and of the connecting element 7 with a lip 18 is shown. In FIG. 10, a web 20 of the guide element 2 located in front of the opening 5 is radially bent inwardly and, accordingly, has an enlarged contact surface relative to the lip 18 of the connecting element 17. In FIG. 11, the lip 18 is covered by a bent tongue 19 which also effects an enlargement of the contact surface for the lip 18.

Figure 12:
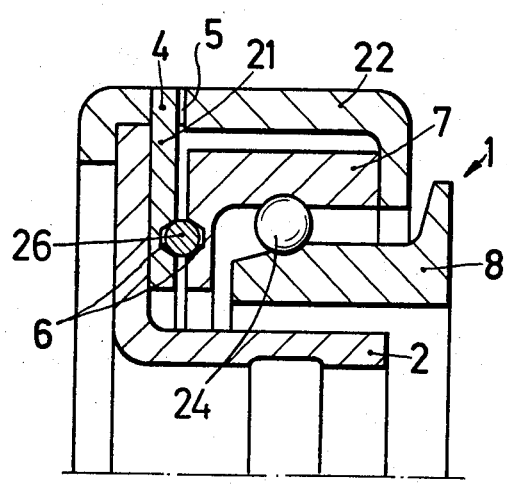
FIG. 12 is a longitudinal sectional view taken through a clutch release device having a rigid disc with radial lips operating as the element which is rotatively rigid and which is secured against rotation relative to the stationary bearing ring of the roller bearing assembly.

FIG. 12 depicts in longitudinal section a clutch release device consisting of a guide element 2 in the form of a slide sleeve, a roller bearing assembly 1 with the rotating bearing ring 8, the stationary bearing ring 7 and the roller bodies 24, in which the connection which is rotatively rigid to the guide element 2 or to a housing which is rigidly connected to the latter being effected by a rigid disc 21 which, with several lips 4 at its outer periphery, engages corresponding openings 5 of the housing 22. The connection between the rigid disc 21 and the stationary bearing ring 7 is effected through conical grooves 6 which are arranged opposite each other in both components with a wire ring 26 clamped therebetween. Also, in this embodiment, the disc 21 is arranged in the housing 22 so as to be movable to a predetermined extent to allow the roller bearing assembly 1 to become radially adjusted in accordance with existing deviations.

While specific embodiments of the invention have been shown and described in detail to illustrate the application of the inventive principles, it will be understood that the invention may be embodied otherwise without departing from such principles.

What is claimed is:

1. In a clutch mechanism, particularly for motor vehicles, including a roller bearing assembly composed of a rotating member, a nonrotative member and roller bodies operatively interposed therebetween, clutch releasing means operatively associated with said rotating member, a guide element having said roller bearing assembly mounted in operative association therewith and clutch control means adapted to effect clutch actuating movement of said guide element, the improvement comprising connecting means interposed between said guide element and said nonrotative member for transmitting clutch actuating forces therebetween, said connecting means being configured to maintain said guide element and said nonrotative member rotatively fixed relative to each other while simultaneously allowing radial relative movement therebetween, said connecting means comprising a resilient annular member having first and second portions radially and circumferentially displaced relative to each other, said first portions being in fixed rotative engagement with said guide element, said second portions being in fixed rotative engagement with said stationary member.

2. A clutch control mechanism, particularly for a clutch assembly for motor vehicles, comprising: roller bearing means adapted to be actuated to effect operational control of said clutch assembly, said roller bearing means comprising a nonrotative member, a rotative member and roller bearings therebetween; a guide element movable in the direction of the rotational axis of said clutch assembly in response to actuating means of said clutch assembly to apply to said roller bearing means actuating forces to effect control of said clutch assembly; and connecting means operatively interposed in the path of movement between said guide element and said nonrotative member of said roller bearing means to transmit said actuating forces from said guide element to said roller bearing means; said connecting means being configured to hold said guide element and said nonrotative member rotatively fixed but radially movable relative to each other.

3. An assembly according to claim 1 wherein said connecting means is arranged to transmit said clutch actuating forces in directions axially of said clutch mechanism.

4. The improvement according to claims 1 or 2 wherein said connecting means is engaged in rigid positive locking engagement against rotation between one of said nonrotative member and said guide element by a clamping connection which acts frictionally therebetween in the circumferential direction.

5. The improvement according to claim 2 wherein said connecting means comprise an axially arranged annular disc having projecting lips extending radially therefrom, with said annular disc being in rotatively fixed engagement with one of said nonrotative member and said guide element by means of radially open recesses formed therein to receive said radially projecting lips of said annular disc, and with said annular disc being in rotatively fixed locking engagement with the other of said nonrotative member and said guide element by means of a clamping connection which includes a clamped ring located between axially oppositely located grooves, one of said grooves being formed in said annular disc and the other of said grooves being formed in an annular end face of said other of said nonrotative member and said guide element.

6. The improvement according to claim 2 wherein said connecting means comprise a radially resilient ring, and wherein one of said nonrotative member and said guide element is formed with a circumferential groove having said connecting ring seated therein, said resilient ring having radially extending lips which interact with radial recesses formed in the other of said nonrotative member and guide element.

7. The improvement according to claim 6 wherein said circumferential groove is provided on an inner peripheral surface of said nonrotative member and wherein said recesses are provided on an outer peripheral surface of said guide element.

8. The improvement according to claim 7 wherein said guide element is formed as a sleeve and wherein said recesses are axially defined by a part of said sleeve and by axially oppositely located shoulders of a ring member seated on said sleeve.

9. The improvement according to claim 7 wherein said guide element is constructed as a slide sleeve and wherein said groove is provided at an inner peripheral surface of said slide sleeve, said groove having openings which extend radially through said slide sleeve to enable passage therethrough of lips formed on said resilient ring which project radially outwardly therefrom and engage recesses of said nonrotative member.

10. The improvement according to claim 6 wherein said resilient ring is an open spring ring.

11. The improvement according to claim 10 wherein said spring ring is formed of steel wire.

12. The improvement according to claim 10 wherein said lips are formed by bent portions of said ring.

13. The improvement according to claim 6 wherein said ring is formed as a die-punched part.

14. The improvement according to claim 6 wherein said component containing said groove is formed with an entry guide bevel.

15. The improvement according to claim 6 wherein said groove is formed with a trapezoidal cross section.

16. The improvement according to claim 6 wherein the edges of said groove project beyond said ring.

17. The improvement according to claim 6 wherein said recesses are defined by material portions which are deformable and wherein, between said recesses and an axial edge of said deformable material regions, there is provided a tongue which may be bent to permit access to said recesses.

18. The improvement according to claim 17 wherein in order to enlarge the axial contact surfaces of said tongues in a region of said recesses determined for producing rotatively rigid locking engagement of said lips, the material of said region is formed in the direction toward said connecting element bent in order to form said tongue.

19. The improvement according to claims 1 or 2 wherein said connecting means is essentially arranged to occupy a plane which extends perpendicularly relative to the releasing direction of said clutch mechanism.

20. In a clutch mechanism particularly for motor vehicles, including a roller bearing assembly composed of a rotating member, a nonrotative member and roller bodies operatively interposed therebetween, clutch releasing means operatively associated with said rotating member, a guide element having said roller bearing assembly mounted in operative association therewith and clutch control means adapted to effect clutch actuating movement of said guide element, the improvement comprising connecting means interposed between said guide element and said nonrotative member for transmitting clutch actuating forces therebetween, said connecting means being configured to maintain said guide element and said nonrotative member rotatively fixed relative to each other while simultaneously allowing radial relative movement therebetween, said connecting means being coupled with said nonrotative member and with said guide element in a positive locked manner taken in the circumferential direction while being freely movable relative thereto taken in the radial direction.

21. In a clutch mechanism, particularly for motor vehicles, including a roller bearing assembly composed of a rotating member, a nonrotative member and roller bodies operatively interposed therebetween, clutch releasing means operatively associated with said rotating member, a guide element having said roller bearing assembly mounted in operative association therewith and clutch control means adapted to effect clutch actuating movement of said guide element, the improvement comprising connecting means interposed between said guide element and said nonrotative member for transmitting clutch actuating forces therebetween, said connecting means being configured to maintain said guide element and said nonrotative member rotatively fixed relative to each other while simultaneously allowing radial relative movement therebetween, said connecting means comprising a radially resilient ring, one of said nonrotative member and said guide element being formed with a circumferential groove having said connecting ring seated therein, said resilient ring having radially extending lips which interact with radial recesses formed in the other of said nonrotative member and guide element.

* * * * *